2,932,090

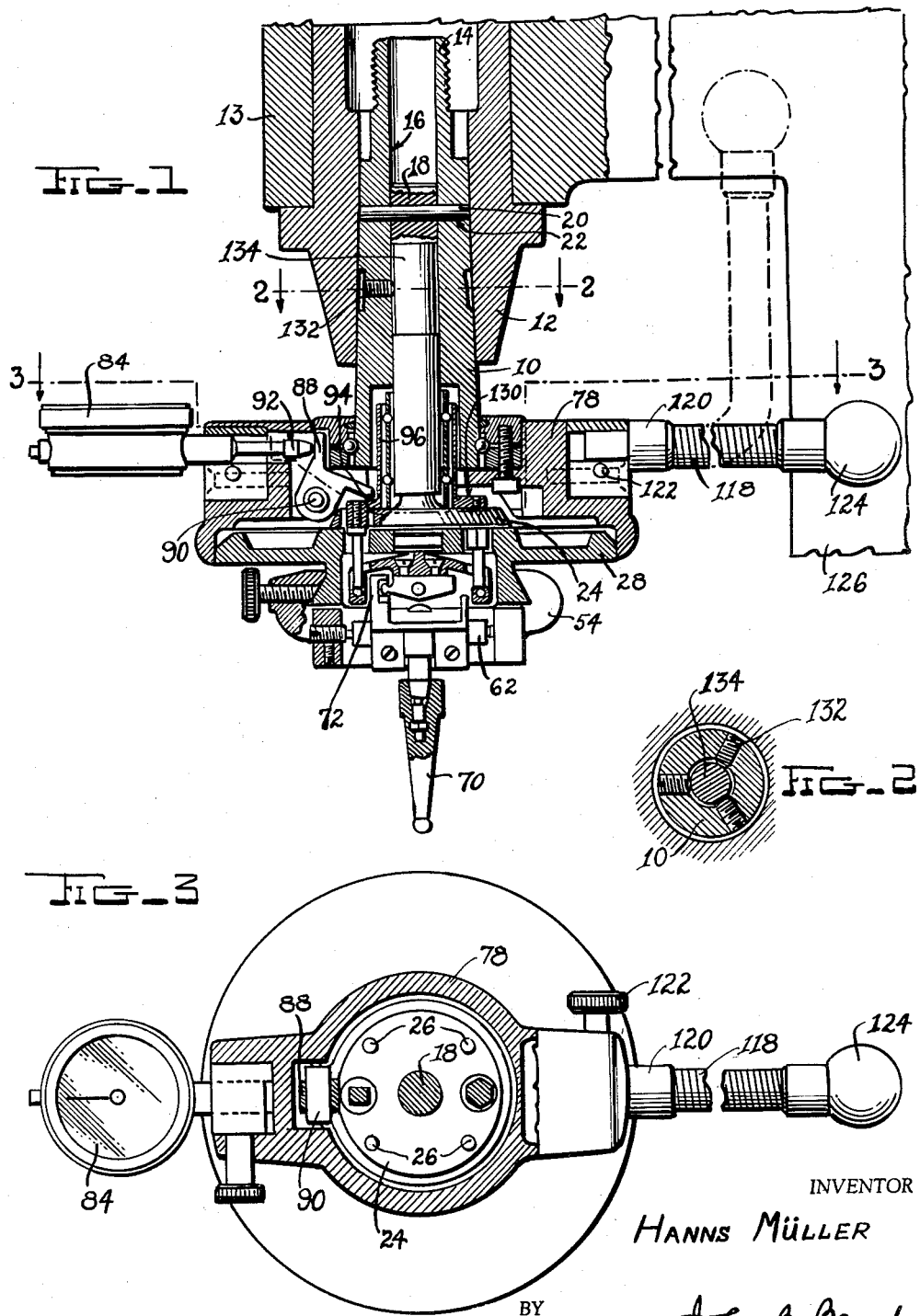

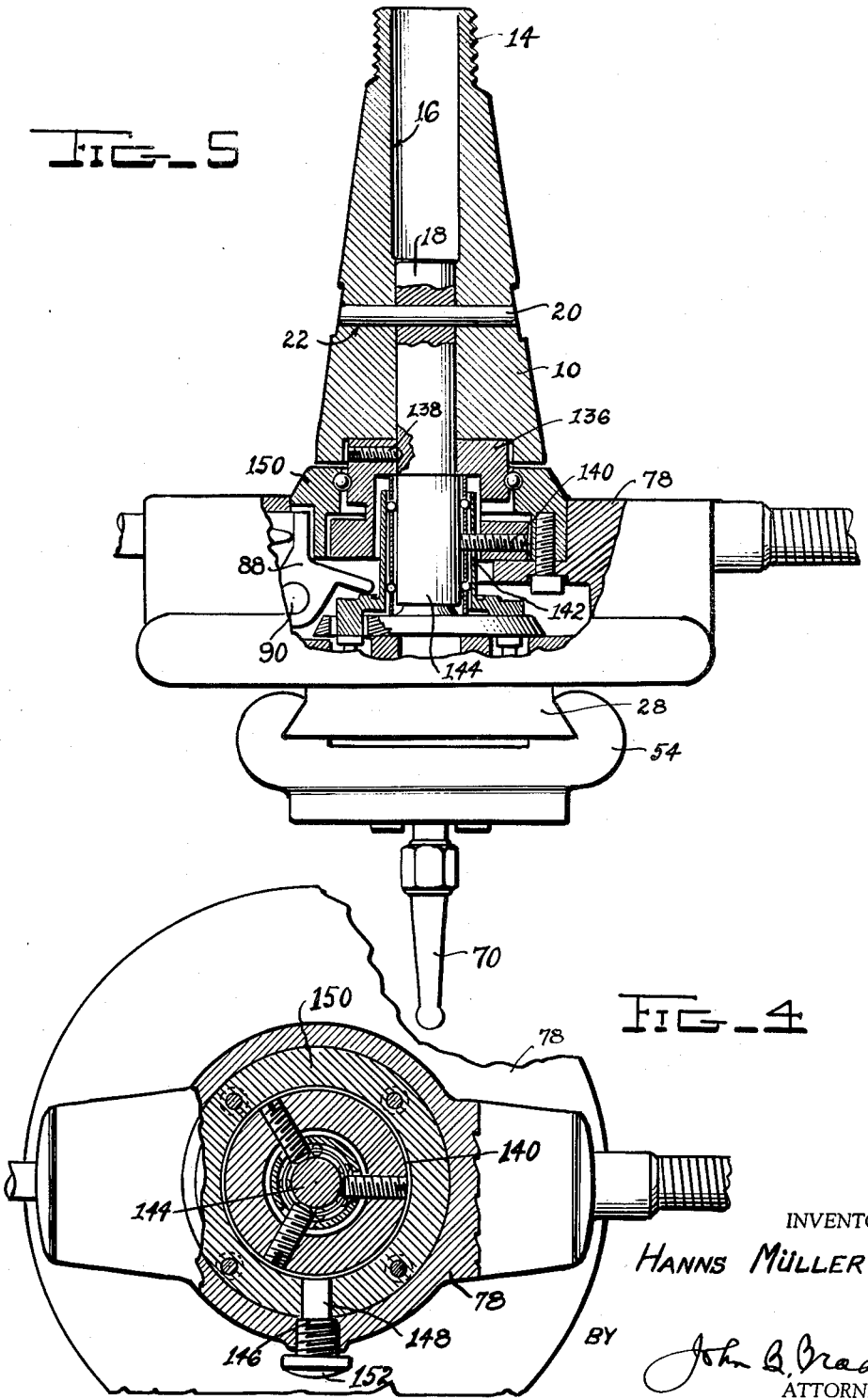

ADJUSTABLE LEVER GAGE

Hanns Müller, Munich, Germany, assignor to Hans Deckel, Munich-Solln, Germany, and Friedrich Wilhelm Deckel, Zug, Switzerland Application June 14, 1956, Serial No. 591,341

Claims priority, application Germany June 16, 1955

6 Claims. (Cl. 33—172)

This invention relates to an adjustable lever gage whereby precise initial adjustments may be made before the commencement of measurement operations.

One of the objects of my invention is to provide an adjustable compensating mechanism interposed between driving means, a feeler lever and a dial gage for setting the dial gage for precision readings.

The invention relates to an adjustable lever gage which can be readily inserted into a rotating shaft, for example, the spindle of a machine tool, and where a rotating working surface is arranged in the transmission rods between the rotating feeler lever and a fixed indicating device.

The invention is directed to an adjustable lever gage which is simple and inexpensive and also sensitive and efficient and which permits adjustments in the completely assembled state of the device.

This problem is solved according to the invention by supporting the rotating working surface by means of an elastically deformable intermediate part in the insert and providing adjustable pressure means acting on the intermediate part by means of which the rotational axis of the working surface can be aligned with the axis of rotation.

The invention will be more clearly understood from the following specification by reference to the accompanying drawings showing two embodiments of the adjustable lever gage according to the invention, in which:

Fig. 1 is a side elevational view with parts shown in vertical section through a lever gage equipped with the compensation means by my invention;

Fig. 2 is a fragmentary transverse sectional view taken substantially on line 2—2 of Fig. 1;

Fig. 3 is a fragmentary plan view partially broken away and shown in horizontal section substantially on lines 3—3 of Fig. 1;

Fig. 4 is a transverse fragmentary sectional view taken through a modified form of adjustable lever gage assembly showing a modified compensating means embodying my invention; and Fig. 5 is a side elevational view of the form of adjustable lever gage illustrated in Fig. 4, the view being partially broken away and shown in vertical section to illustrate the compensating means embodied in the form of my invention shown in Fig. 4.

The adjustable lever gage (Figs. 1 to 3) is carried by a conical mandrel 10, which is inserted in the spindle 12 of the machine rotatably mounted in the machine frame 13. Said mandrel is clamped in said spindle in conventional manner by means not shown, cooperating with the screw part 14 of said mandrel 10. The conical mandrel 10 has an axial bore 16, in which is arranged a bearing journal 18 which is retained in the conical mandrel 10 by means of a pin 20 provided in a transverse bore 22. The bearing journal 18 has at its lower end a frontal flange 24 (Figs. 1 and 3) to which a hollow capped bearing body 28 is attached by means of screws 26, which thus participated in the rotating motions of the spindle 12 and of the conical mandrel 10 respectively.

In the bearing body 28 a slide 54 is adjustable transverse to the axis of rotation which carries the angular feeler lever 70, 72. The deflections of the feeler lever 70, 72 are transmitted over transmission rods as axial motions to a sleeve 96, which rotates together with the part 18, but is axially displaceable with regard to the latter. This sleeve has a flange 94 which forms a working surface 130 that cooperates with one arm of an angle lever 88, pivotally supported at 90 on the carrier 78. The other arm of the angle lever 88 engages the feeler 92 of a dial gage 84 which is mounted on the carrier 78.

The transmission of the motion of the feeler lever 70, 72 to the sleeve 96 is effected, as already mentioned, by means of transmission rods. The construction of these rods is described more fully in my copending application Serial Number 591,342, filed June 14, 1956, now Patent No. 2,872,737, dated February 10, 1959.

To enable the carrier 78 to be stopped securely in the most favorable position for the reading of the dial gage 84 during the turns of the feeler lever 70 and 72 of the bearing 28 necessary for the measurements, a flexible accordion tube 118 is inserted with its ends 120 in the carrier 78 and locked by means of a clamping screw 122. The other end of the accordion tube 118 has a spherical knob 124, which abuts, by corresponding bending of the tube, on a suitable fixed support, for example, on one side of the spindle frame 126.

It was found that one of the most important prerequisites for obtaining satisfactory measuring results is a true run of the working surface 130 of the flange 94 relative to the axis of rotation. To this end the following means are provided according to the invention:

In the conical mandrel 10 are provided on the circumference three set-screws 132, staggered by 120 degrees (Figs. 1 and 2), which bear against the offset part 134 of the bearing journal 18. By actuating these compensating screws 132 a minor elastic bending of the bearing journal 18 can be achieved so that the rotational axis of the working surface 130 of the flange 94 is aligned correspondingly with the axis of rotation. The operator will thus actuate the compensating screws 132 during the adjustment until the pointer of the dial gage 84 does not indicate any deflection. In this case a true run of the working surface 130 relative to the axis of rotation has been achieved and the lever gage is adjusted.

In the type of my invention according to the embodiments of Figs. 4 and 5 the carrier is not supported on the conical mandrel 10 but on a bushing 136, the upper portion of which is secured on the bearing journal 18 by means of radially disposed set screws 138. In this case three compensating screws 140 are arranged in the lower portion of bushing 136, as shown, and they penetrate axial slots 142 of the sleeve 96 and press against the lower part 144 of the bearing journal 18.

In the carrier 78 there is provided a threaded bore 146 (Fig. 4), parallel to a bore 148 in the ball bearing ring 150 of the carrier 78. Through this passage the operator can introduce a screw driver, etc. to actuate the compensating screws 140 which are successively oriented into position aligned with passage 148 without having to remove the feeler lever 70, 72 from the spindle. The adjusting operation is thus facilitated. After the adjustments have been made, which are otherwise performed in the same manner as in the preceding example, the threaded bore 146 is closed by a plug 152.

Instead of the compensating screws 140 shown by way of an example, other equivalent means can be also used to attain the goal according to the invention; for example, pressure eccentrics, etc. In the type of adjustable lever gage shown by my invention it is of considerable importance that, when adjusting the lever gage, (i.e. if no pressure is exerted upon the feeler lever 70), the angular lever 88 be slightly pressed against the working surface, and remain stationary despite the rotating working surface 130 and execute no wavering movement around its axis 90. This is the case, if the distance between the axis 90—or generally the distance of each element of the stationary part of the device—and the plane of the rotary working surface 130 is always, i.e. at each rotary position, the same, that is constant. In other words, it is of importance, when adjusting the lever gage device, to align the plane working surface 130 with respect to the stationary part (78, 84, 90 etc.) of the lever gage assembly. For this purpose according to the first embodiment of my invention (Figs. 1-3) the bearing of the sleeve 96 is aligned by deforming the pivot pin 18, while the bearing of the stationary part remains unchanged. According to the second embodiment of my invention (Figs. 4-5) the bearing of the stationary part has been aligned with respect to the pivot pin 18 by tilting the bushing 136, while the bearing of the rotary sleeve 96 remains unchanged.

While I have described my invention in certain of its preferred embodiments I realize that modifications may be made, and I desire that it be understood that no limitations upon my invention are intended other than may be imposed by the scope of the appended claims.

What I claim as new and desire to secure by Letters Patent of the United States is as follows:

1. An adjustable lever gage in combination with a rotary driving spindle, said lever gage including, an elastically deformable rotary shaft carried by said driving spindle, a stationary carrier in which said shaft is rotatably mounted, a dial gage mounted on said carrier, an operating member for said dial gage, a rotary feeler lever associated with said shaft, an axially displaceable part on said shaft provided with a plane working surface, means for transmitting movements from the working surface to the operating member of said dial gage, means for transmitting movements from the feeler lever to the working surface, means associated with said driving spindle and engaging said shaft for deforming the deformable shaft and aligning the working surface relatively to the stationary part of the lever gage carrying the dial gage.

2. An adjustable lever gage in combination with a rotary driving spindle, an elastically deformable rotary shaft carried by said driving spindle, a stationary carrier in which said deformable rotary shaft is rotatably mounted, a dial gage mounted on said carrier, a rotary feeler lever associated with said deformable rotary shaft, an axially displaceable part on said deformable rotary shaft provided with a plane working surface, means for transmitting movements from the working surface to the dial gage, means for transmitting movements from the feeler lever to the working surface, screw devices associated with the driving shaft and engaging said deformable rotary shaft for deforming it and aligning the working surface relatively to the stationary part of the lever gage carrying the dial gage.

3. An adjustable lever gage in combination with a rotary driving spindle, a member insertable into said spindle, a lever gage assembly, said lever gage assembly including an elastically deformable rotary shaft operated by said driving spindle, a surrounding stationary carrier in which said member is rotatably mounted, a dial gage mounted on said carrier, a rotary feeler lever associated with said deformable rotary shaft, an axially displaceable part on said deformable rotary shaft provided with a plane working surface, means for transmitting movements from the working surface to the dial gage, means for transmitting movements from the feeler lever to the working surface, a multiplicity of screw devices associated with said deformable rotary shaft, in a plane perpendicular to the axis of rotation, said screw devices being disposed at equal intervals along the circumference of the deformable rotary shaft.

4. Adjustable lever gage as set forth in claim 2, in which there are provided additional passages through the surrounding carrier covering the screw devices of the lever gage by means of which the screw devices are accessible.

5. An adjustable lever gage comprising a stationary part and a rotatable part, a rotary driving spindle, an elastically deformable shaft carried by said spindle, said gage including a motion transmitting member insertable into said driving spindle, a feeler lever associated with said rotary shaft, a sleeve axially displaceably mounted on said shaft and having a plane working surface, said stationary part concentrically surrounding said sleeve, an angle lever pivotally mounted on said stationary part, a dial gage mounted on said stationary part and having an operating member extending therefrom including a pair of arms, one of said arms engaging the working surface of said sleeve and the other arm engaging said operating member of said dial gage, said angle lever operating to transmit movement from the working surface to the dial gage, means for transmitting movement from the feeler lever to said working surface, and means comprising three screws disposed in a plane substantially perpendicular to the axis of rotation carried by said spindle and spaced 120° around said shaft and engaging said shaft at equal intervals for tilting said sleeve relatively to the axis of the shaft for thus bringing the axis of said sleeve into parallelism with the axis of rotation of said shaft.

6. An adjustable lever gage insertable into a rotary spindle, said gage comprising a rotary shaft carried by said spindle, a feeler lever associated with said rotary shaft, a sleeve axially displaceably mounted on said shaft and having a plane working surface, a bushing elastically mounted on said shaft and simultaneously rotating therewith and rotatably mounted in a stationary part of the lever gage device, a dial gage mounted on said stationary part, means for transmitting movement from the working surface to the dial gage, means for transmitting movement from the feeler lever to said working surface, and means comprising three screws associated with said bushing and disposed in a plane perpendicular to the axis of rotation, said screws being spaced 120° around said shaft and engaging said shaft at equal intervals for tilting said bushing relatively to the axis of the shaft for thus aligning said stationary part of the lever gage device relatively to the rotating working surface.

References Cited in the file of this patent

UNITED STATES PATENTS

| | | |
|---|---|---|
| 1,723,529 | Schwieterman | Aug. 6, 1929 |
| 2,121,848 | Winters | June 28, 1938 |